US008438153B2

(12) United States Patent
Krishna et al.

(10) Patent No.: US 8,438,153 B2
(45) Date of Patent: May 7, 2013

(54) PERFORMING DATABASE JOINS (75) Inventors: Murali Krishna, Vancouver, WA (US);
Harumi Kuno, Cupertino, CA (US);
Vijay M. Sarathy, Portland, OR (US);
Subrata Naskar, West Bengal (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 12/901,934

(22) Filed: Oct. 11, 2010

(65) Prior Publication Data

US 2012/0089594 A1   Apr. 12, 2012

(51) Int. Cl.
*G06F 7/00* (2006.01)

(52) U.S. Cl.
USPC .......................................... 707/714

(58) Field of Classification Search .................... 707/714
See application file for complete search history.

(56) References Cited

U.S. PATENT DOCUMENTS

| | | | |
|---|---|---|---|
| 5,412,804 A | 5/1995 | Krishna | |
| 5,548,755 A | 8/1996 | Leung et al. | |
| 5,987,453 A * | 11/1999 | Krishna et al. | 1/1 |
| 6,411,951 B1 | 6/2002 | Galindo-Legaria et al. | |
| 6,581,052 B1 * | 6/2003 | Slutz | 1/1 |
| 6,643,636 B1 | 11/2003 | Au et al. | |
| 6,763,352 B2 | 7/2004 | Cochrane et al. | |
| 7,263,512 B2 | 8/2007 | McGoveran | |
| 7,275,056 B2 | 9/2007 | Cheng et al. | |
| 7,277,873 B2 | 10/2007 | Brown et al. | |
| 7,774,336 B2 | 8/2010 | Beyer et al. | |
| 2005/0114311 A1 * | 5/2005 | Cheng et al. | 707/3 |
| 2009/0055370 A1 * | 2/2009 | Dagum et al. | 707/4 |

* cited by examiner

*Primary Examiner* — Amy Ng (57) ABSTRACT

A method of performing a database join includes receiving a query. The query may specify a join of a first table and a second table. The method further includes determining a new predicate based on a mapping between a first column of the first table and a second column of the second table for a plurality of tuples of the join. Further, the method includes modifying the query such that the query comprises the new predicate.

11 Claims, 10 Drawing Sheets

PERFORMING DATABASE JOINS

BACKGROUND

The Join operator is the most computationally expensive of relational database operations. The following relational query:

Select * From R, S Where R.A=S.A    QUERY 1 is a join of two tables, R and S, with equi-join predicate, R.A=S.A. When compiling a join query, a specific computational algorithm is chosen that performs the join when the query is executed.

If the hash join algorithm is chosen for QUERY 1, when executed, the join may fully scan both the R and S tables. For example, the hash algorithm may use build and probe tables to perform the algorithm. One of the tables in the join may be used as the build table, the other, the probe table. If the build table is R, and the probe table is S, the hash algorithm may build the hash table with the full table R, and then probe the entire S table.

Scans of entire tables are computationally expensive. An improved method for performing joins would be useful.

BRIEF DESCRIPTION OF THE DRAWINGS

Certain embodiments are described in the following detailed description and in reference to the drawings, in which.

DETAILED DESCRIPTION

Figure 1A:
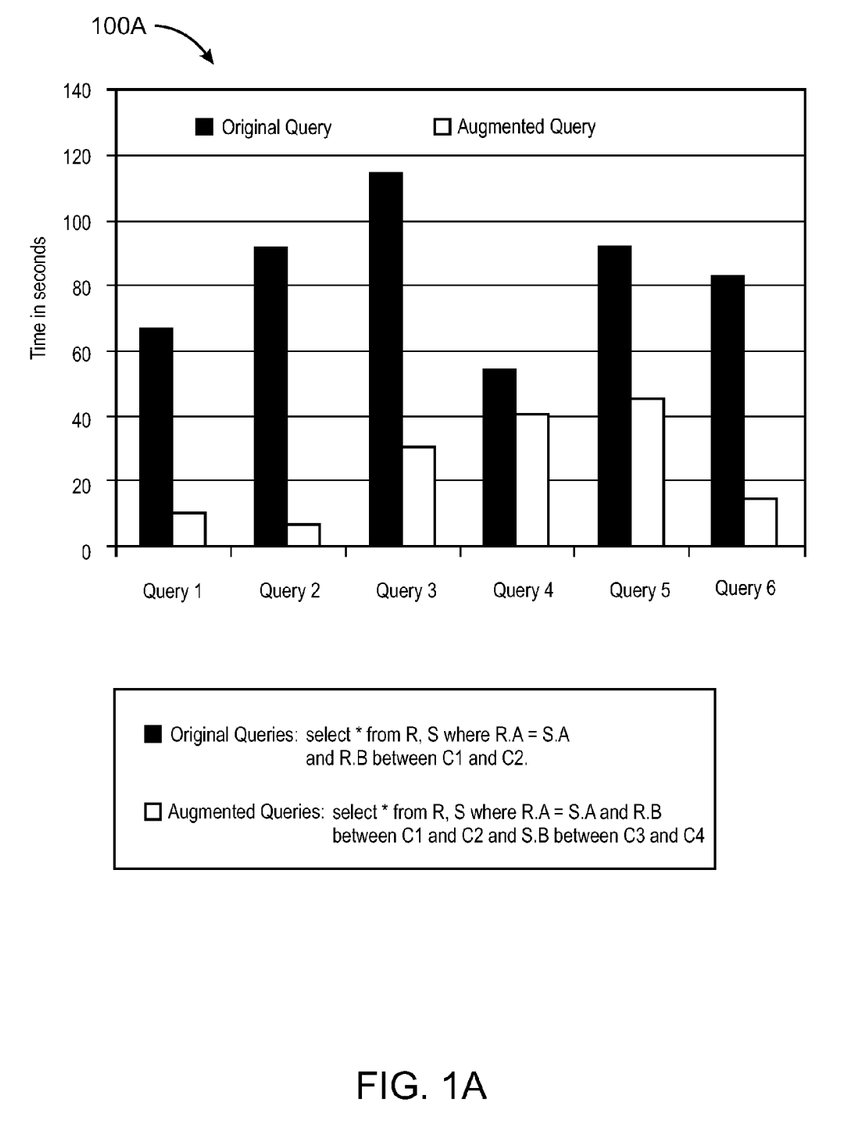
FIGS. 1A-1B are graphs showing improved join performance in a test conducted in accordance with an example embodiment of the invention.
Figure 1B:
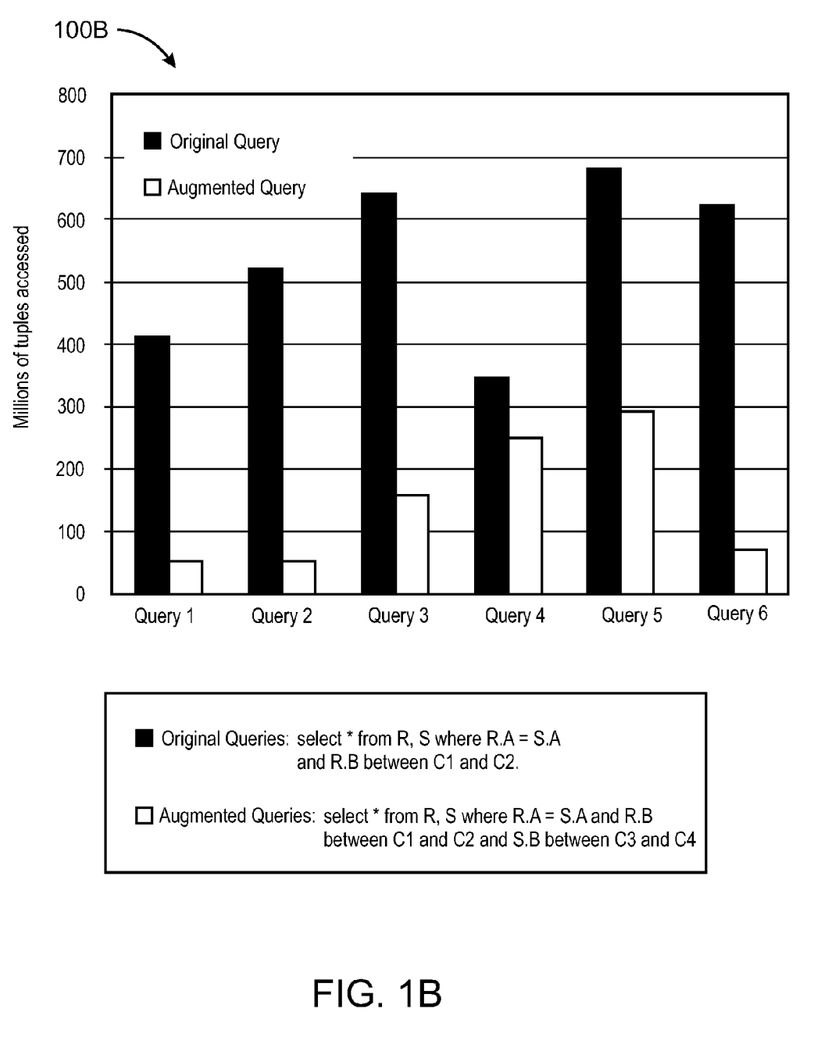

FIGS. 1A-1B are graphs showing improved join performance in a test conducted in accordance with an example embodiment of the invention. Many times, a join query may produce join result tuples (tuples) where relationships exist between two, or more, non joining columns. These relationships may exist across the various join tables.

For example, the date of shipments stored in a first table may always occur within 30 days of an order date stored in a second table. However, in some cases, relationships may exist that are more arbitrary than the example given. In such cases, it may be challenging to describe these relationships mathematically, making it difficult to capture the relationship in a multi-table relational constraint.

In an exemplary embodiment of the invention, the relationships may be captured in an auxiliary join bit map (bit map). The bit map, described in greater detail with reference to FIGS. 2A-2C, may be used to exploit the relationships to infer an additional predicate on the join query.

Further, the additional predicate may be used to augment an original join query. Without changing the results, the additional predicates may make it possible to reduce the number of tuples processed by the join query.

Reducing the number of tuples that a join processes may improve join performance. If the additional predicate references a column that is indexed or partitioned, fewer tuples may be scanned during the join. For sort merge joins, the number of tuples to be sorted and merged may be reduced.

Additionally, for joins processed with a hashing algorithm, the build tuples and probe tuples may be reduced. Reducing the number of build tuples may result in lower memory consumption by the join query, which is beneficial. In one embodiment of the invention, the original query may include multiple equi-join predicates, e.g., "R.X=S.X and R.Y=S.Y . . ."

FIGS. 1A-1B show comparisons of processing for a query and an augmented version of the query. The augmented version of the query was generated with an embodiment of the invention.

As shown, an "Original Query," in the form of:

Select * from R, S where R.A=S.A and R.B between
        C1 and C2    QUERY 2 was augmented with an additional predicate. The "Augmented Query" was in the form of:

Select * from R, S where R.A=S.A and R.B between
        C1 and C2, and S.B between C3 and C4.    QUERY 3

FIG. 1A shows an improvement in running time, for the queries labeled "Query 1-Query 6" in the graph 100A. FIG. 1B shows a reduction in the number of tuples processed when queries augmented in an embodiment of the invention were executed.

In an exemplary embodiment of the invention, the original query may take many forms. The example shown in QUERY 2 is merely one embodiment, used for illustration and clarity.

For example, in the case that the original query had range predicates on both R.B and S.B, new predicates for the two columns (or other columns) may be used to augment the original query. Augmenting the original query in this way may reduce the number of tuples flowing to the join. It should be noted that the original query may contain conjunctive predicates, disjunctive predicates, or both.

Figure 2:
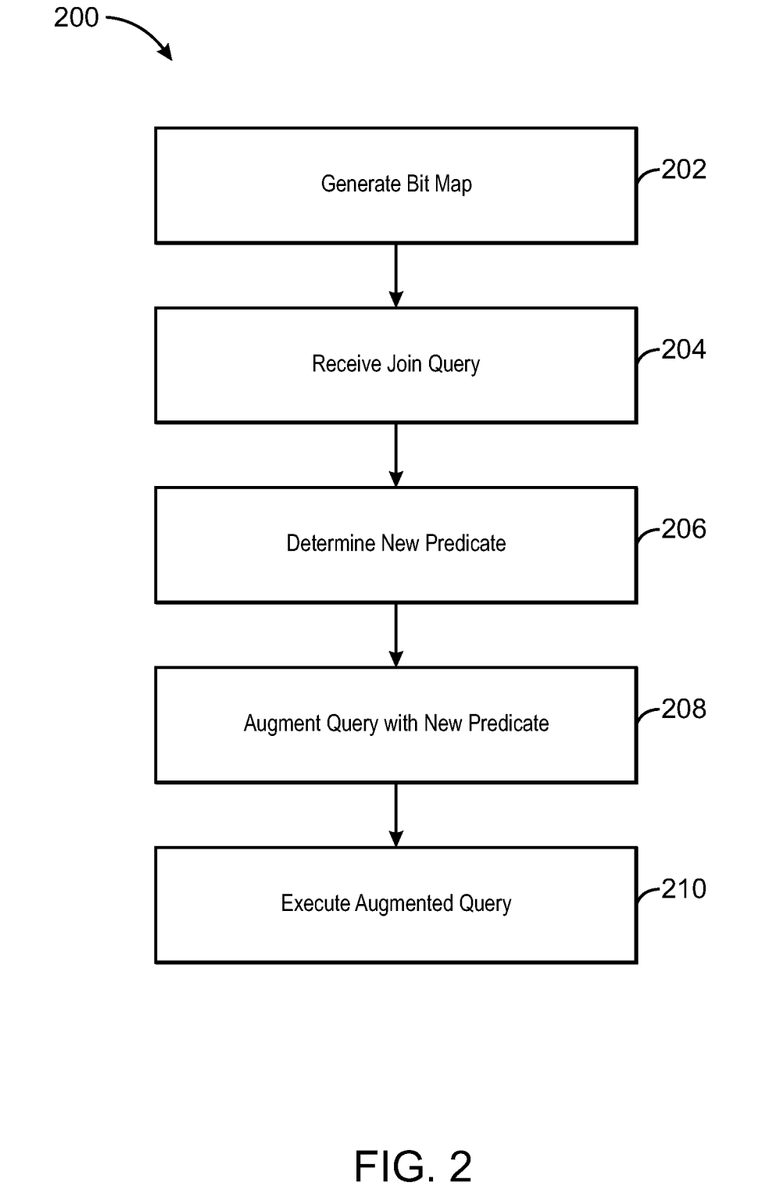
FIG. 2 is a process flow diagram of a method for performing joins in accordance with an example embodiment of the invention.

FIG. 2 is a process flow diagram of a method 200 for performing joins in accordance with an example embodiment of the invention. It should be understood that the process flow diagram is not intended to indicate a particular order of execution. The method 200 may be performed by a database optimizer and executor.

The method 200 is described with reference to FIGS. 3A-3C, which are block diagrams of an auxiliary join bit map in accordance with an embodiment of the invention. The method 200 is further described with reference to FIGS. 4-6, which are data path diagrams for performing joins in accordance with an embodiment of the invention.

The method 200 may begin at block 202, when an auxiliary join bit map (bit map) may be generated. The bit map may capture relationships between columns in each of the join tables, and is described in greater detail with reference to FIG. 3A.

In one embodiment of the invention, the bit map 300 may be initially created offline after data is loaded into the joined tables. In another embodiment of the invention, the bit map 300 may be generated based on an analysis of a workload running against the database.

Figure 3A:
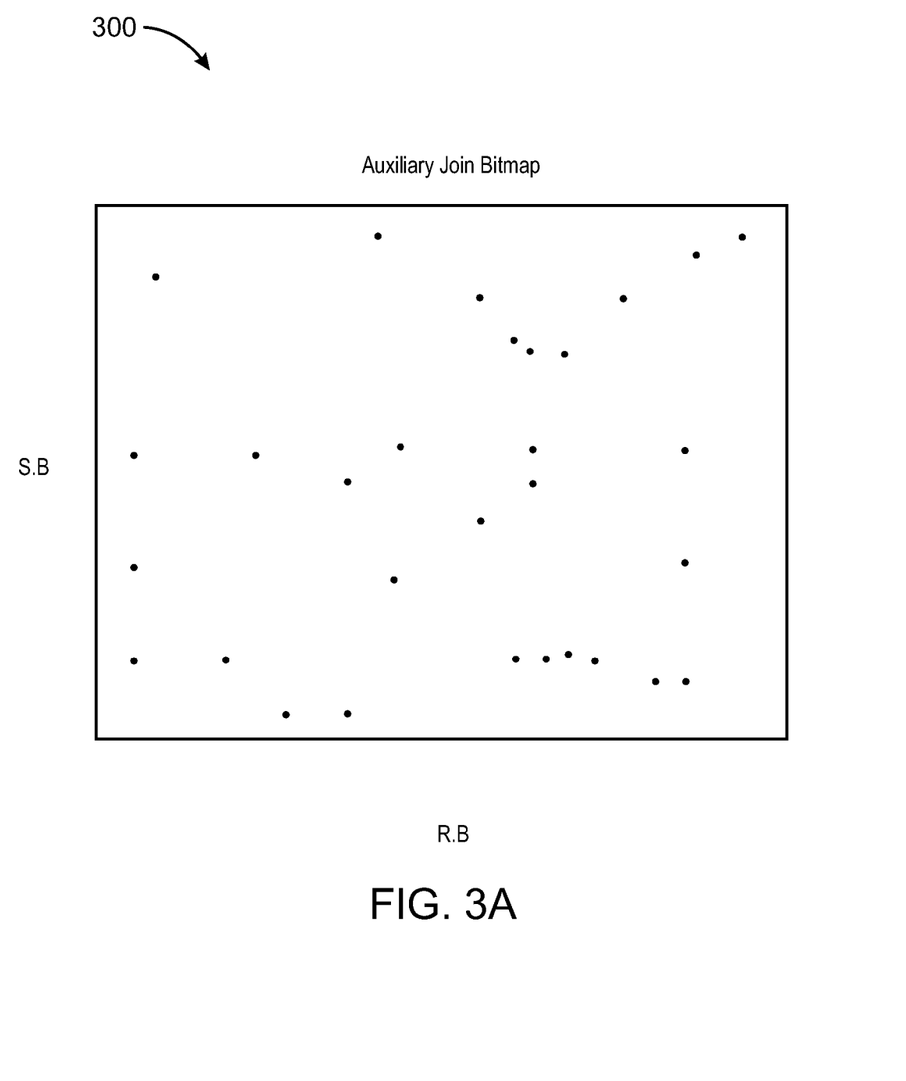
FIGS. 3A-3C are block diagrams of an auxiliary join bit map in accordance with an example embodiment of the invention.
Figure 3B:
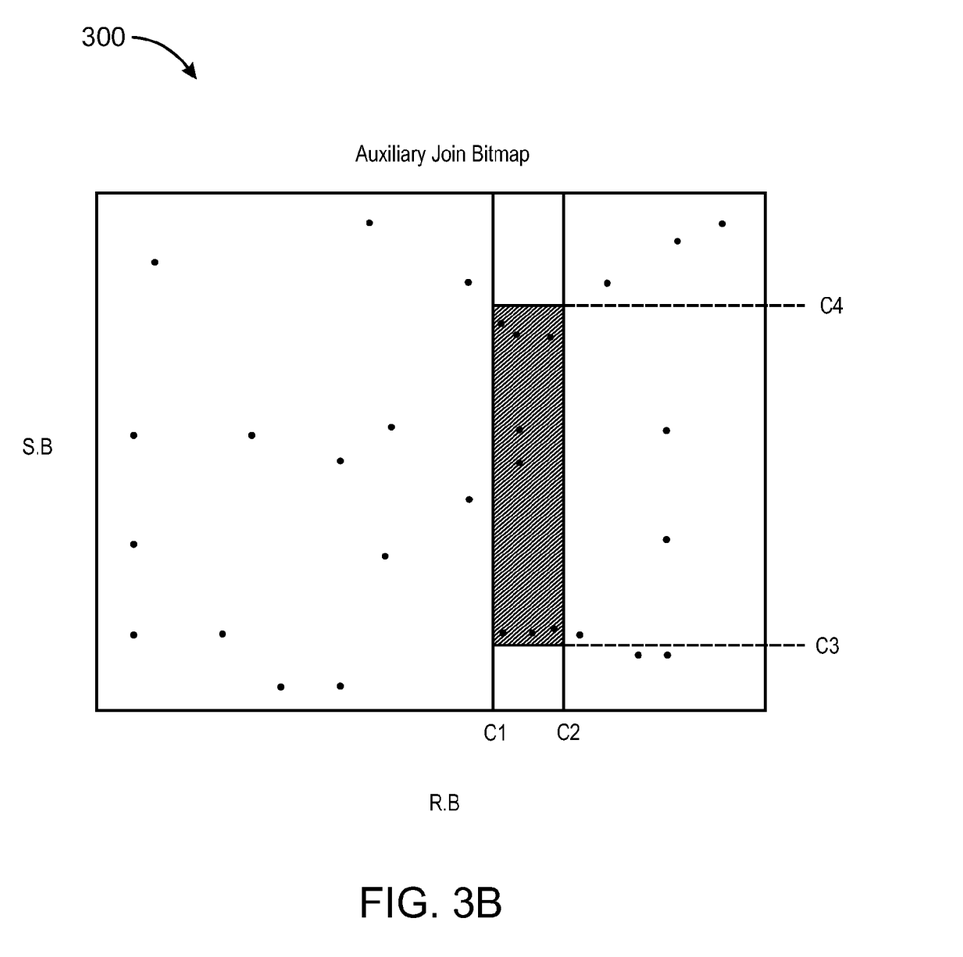

FIG. 3A is a block diagram of a bit map 300 in accordance with an example embodiment of the invention. The bit map 300 may capture relationships between columns of two join tables, R.B and S.B, even if the relationships are challenging to describe mathematically.

The column S.B may be selected from table S randomly. In one embodiment of the invention, the column S.B may be selected based on the efficiencies provided by augmenting the original query with an additional predicate on column S.B.

The bit map 300 may be a multi-dimensional array, with one dimension for each table in the join. The number of bits in the bit map 300 may be equal to |R.B|*|S.B|, where |R.B| and |S.B| denote the number of unique orderable values in the columns R.B and S.B, respectively. Accordingly, each value pair, (R.B, S.B) may represent a potential tuple of the join query result.

Figure 4:
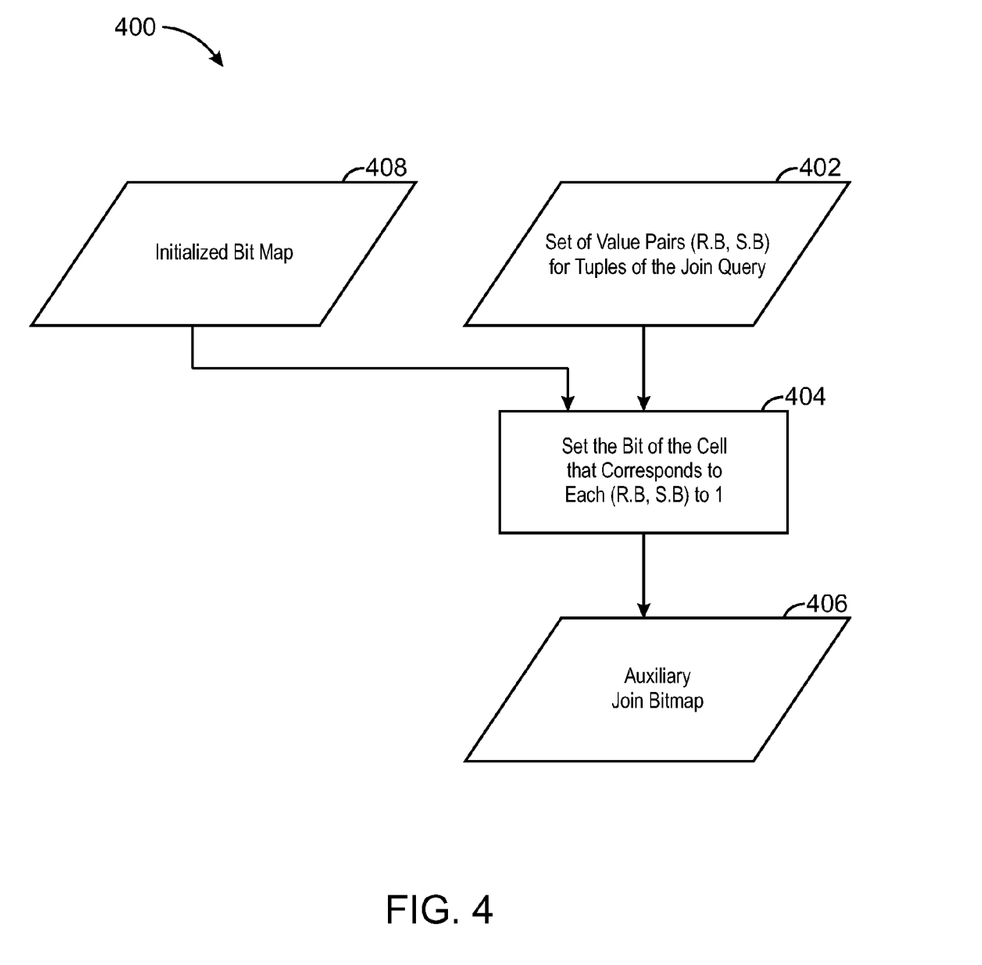
FIG. 4 is a data flow diagram of a method for generating a bit map in accordance with an example embodiment of the invention.

FIG. 4 illustrates a data flow diagram for generating a bit map according to one example embodiment of the invention. As shown, an initialized bit map 408 may be input to a process 404. The initialized bit map 408 may have all the bits set to 0.

Also input to the process 404 may be a set of value pairs (R.B, S.B) for tuples of the join query (set of value pairs) 402. In one embodiment of the invention, the set of value pairs 402 may be populated with the following query:

Select R.B, S.B From R, S Where R.A=S.A.    QUERY 4

In the process 404, the optimizer may modify the initialized bit map 408 to generate the auxiliary join bit map 406. For each value pair (R.B, S.B) in the set of value pairs 402, the optimizer may set a corresponding bit to 1 in the initialized bit map 408. The remaining bits may remain set to 0.

Referring back to FIG. 3A, the bits set to 1 are represented as dots. Accordingly, the empty regions in the bit map 300 represent the bits set to 0.

It should be noted that the bit map 300 merely represents a mapping between a column in a first table and a column in a second table. As such, the mapping may be represented in the bit map 300, or any other data structure, such as a relational database table. The bit map 300 is merely presented here as one example for the mapping.

At block 204, a join query may be received by the optimizer for compiling. The join query may be of the form of the original query, shown in QUERY 2.

At block 206, the optimizer may determine a new predicate for the original query based on the bit map 300. The new predicate may be added to the original query without changing the resulting tuples.

The optimizer may use the bit map 300 to determine a range of values for the new predicate. In one embodiment of the invention, the optimizer may use a clustering identification algorithm to determine the range of values. In another embodiment, these ranges may be pre-computed offline and stored in a mapping structure, and the optimizer may consult this map and look up a precalculated new predicate.

In one embodiment of the invention, the smallest and largest relevant S.B values may be used as the lower and upper bounds of a new range predicate on S.B. The relevant values of S.B may be identified by isolating the R.B values selected from the original query. As shown in FIG. 3B, the R.B values may include a range of values from C1 to C2, [C1, C2].

As is also shown, for values [C1, C2] of R.B, there exist values [C3, C4] for the column S.B in table S. As such, the range of values for the new predicate may be values [C3, C4]. Accordingly, the optimizer may determine a new predicate, "S.B between C3 and C4."

At block 208 the optimizer may augment the join query with the new predicate. In one embodiment of the invention, the original query may be augmented with multiple predicates.

Figure 3C:
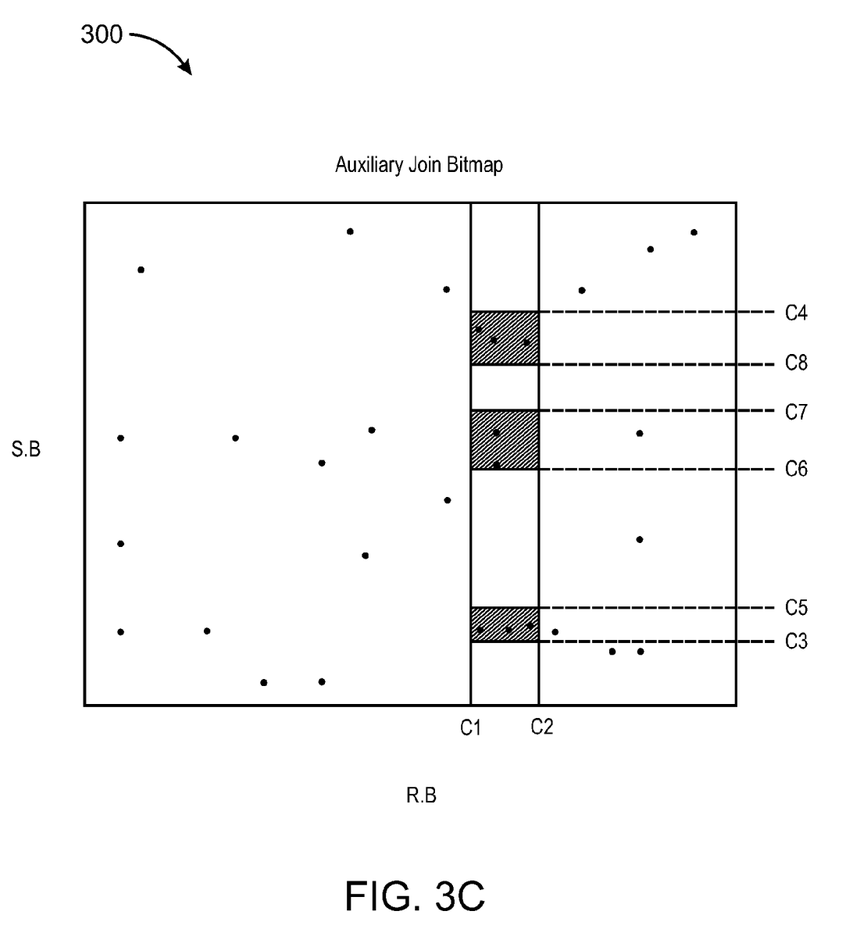

For example, as shown in FIG. 3C, multiple ranges may be identified for column S.B, [C3, C5], [C6, C7], and [C8, C4]. As such, the optimizer may augment the original query with the predicates, "S.B between C3 and C5 OR S.B between C6 and C7 OR S.B between C8 and C4."

At block 210, the augmented query may be executed. The augmented query may be executed by the executor. The new predicates may reduce the number of tuples flowing to the join, thereby reducing the amount of work done by the join. Additionally, if R.B and/or S.B are indexed, the amount of data scanned may also be reduced.

It should be noted that table S may include numerous columns, including S.B. In one embodiment of the invention, a random column may be selected for the new predicate in the augmented query. In another embodiment of the invention, the optimizer may evaluate each column in table S, and select a column based on which predicate makes the join more efficient.

Certain columns may not be selected if the new predicate does not improve the efficiency of the join. For example, if the range of values [C3, C4] spans the entire domain of S.B, or a significant portion, the optimizer may not use column S.B to augment the query. Also, column S.B may not be selected if the cost of evaluating a new predicate for S.B is relatively high.

In another embodiment of the invention, the bit map 300 may be maintained to include updates to tables R and S. For example, values may be added or deleted from the bit map 300 based on rows that are updated, inserted, or deleted from the tables. Advantageously, maintenance on the bit map 300 for deleted values may be avoided without affecting the performance of the augmented query. However, periodic recomputing of the bit map 300 may improve the augmented query's efficiency when the tables are modified significantly.

If new tuples are added to the R and/or S tables, or, if existing tuples are modified, there are two possible scenarios regarding the bit map 300. In one scenario, both the new or modified values of R.B and S.B may be duplicates. If so, and the new base tuples result in any new join tuples, the bits corresponding to R.B, S.B pairs (R.B, S.B) in the new join tuples may be set. Identifying the new join tuples may be efficient only if there are indexes on the join columns, e.g., R.A and S.A.

In the second scenario, one or both of the new values of R.B and/or S.B may not be duplicates. In such a scenario, a larger and newer bit map may be generated. The new bit map may be initially copied from the old bit map.

Unless all the new or modified values of (R.B, S.B) are outside existing ranges, copying the old bits into the new bit map may be computationally expensive. In one embodiment of the invention, if both the values of R.B and S.B are outside the existing ranges, the optimizer may decide not to update the bit map.

In such a case, the optimizer may propagate predicates only if the incoming range specified in the query is also within the range captured by the bit map. Alternatively, the bit map may be periodically discarded and re-built from scratch.

It should be noted that, typically, the R.B and S.B columns may include values that only increase monotonically, e.g., serial numbers or date values. In such a scenario, the bit map may not be updated for every insert in the join tables.

In another embodiment of the invention, the growth of the bit map may be anticipated. In such an embodiment, new bit maps may be allocated with value ranges that are larger than the current ranges. The size of the bit maps may also be dictated by a user with knowledge about the future size of the domains, e.g., a database administrator.

If tuples are deleted from the join tables, corresponding bits in the bit map 300 may be reset to 0 if no other join tuple exists corresponding to that bit. In one embodiment of the invention, the bits may not be reset for deletions because the correctness of the results may not be affected by having too many bits set in the bit map 300.

In one embodiment of the invention, the database management system may automatically generate the bit map 300 for a join on the relevant columns by observing the queries being run over time.

In another embodiment of the invention, the number of bytes used to store the bit map 300 may be equal to (|R.B|*|S.B|)/8, which may be very large. For example, if there are a million distinct values in each domain, at least 125 GBs may be used to store the bit map 300.

For integer domains, the size of the bit map 300 may be scaled down. Rather than setting the bit corresponding to the value for (R.B, S.B), the bit corresponding to the value for (R.B/100, S.B/100) may be set. This may reduce the size of the bit map in typical storage to 125 GB/$100^2$=12.5 MB, which provides a computational cost savings. The smaller bit map may also be more manageable than the larger bit map.

If the given predicate is 'R.B between 88834 and 300274', then the R.B range of the scaled bit map to be inspected may be [88834/100, 300274/100]=[888, 3002]. If the corresponding range of S.B range in the scaled bit map is [901, 1278], then the augmented predicate is 'S.B between 90100 and 127899'. Hence the constants may also be scaled appropriately.

It should also be noted that embodiments of the invention may include columns with the following types of domains: non-integer, non-dense, non-monotonic, and very large. The bit map 300 may be computed and maintained efficiently in such domains using simple scaling and indexing techniques.

Additionally, the bit map 300 may be used to represent relationships between more than two join tables, and more than two columns. The bit map 300 may even be used capture relationships between multiple columns on a single table.

The bit map 300 may be sparse because the number of actual value pairs in the tuples is typically smaller than the number of possible value pairs. In one embodiment of the invention, sparse bit maps may greatly improve join performance. Depending on how sparsely the columns are related, queries augmented as described above may yield orders of magnitude improvement in performance. Because the bit map 300 is not used to directly answer the query, the bit map 300 may be compressed to conserve storage.

Figure 5:
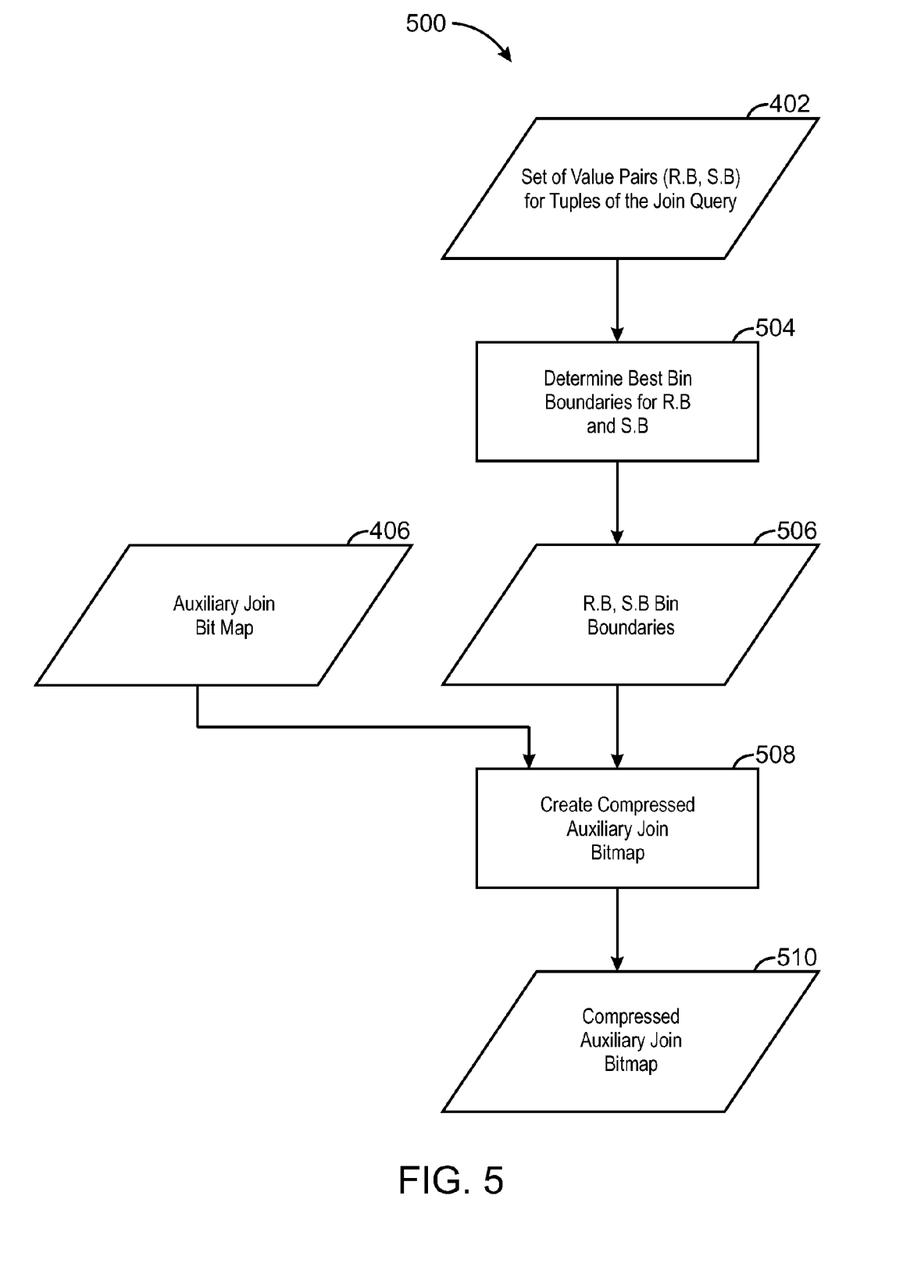
FIG. 5 is a data flow diagram of a method for compressing a bit map in accordance with an example embodiment of the invention.

FIG. 5 is a data flow diagram of a method for compressing the bit map in accordance with an example embodiment of the invention. The set of value pairs 402 may be input to a process 504 that determines bin boundaries for R.B and S.B (bin boundaries) 506. Typical binning mechanisms may be used with either pre-set or dynamically determined range values for determining the bin boundaries 506.

The bit map 406 may then be input with the bin boundaries 506 to a process 508 that generates the compressed bit map 510. The compressed bit map 510 may provide the same efficiencies as the full bit map 406.

Figure 6:
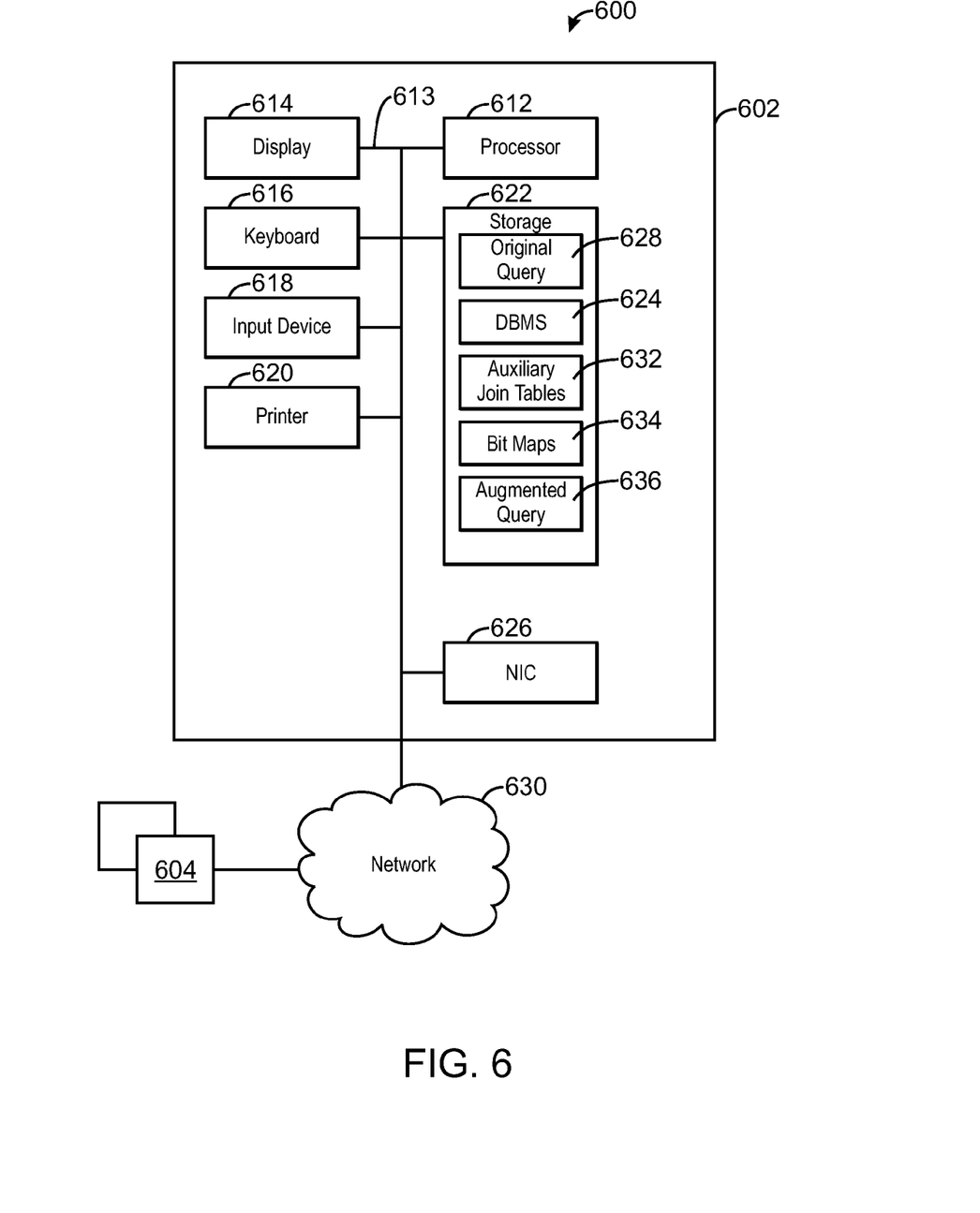
FIG. 6 is a block diagram of a system for performing joins according to an example embodiment of the invention.

FIG. 6 is a block diagram of a system for performing joins according to an example embodiment of the invention. The system is generally referred to by the reference number 600. Those of ordinary skill in the art will appreciate that the functional blocks and devices shown in FIG. 6 may comprise hardware elements, software elements, or some combination of software and hardware. The hardware elements may include circuitry. The software elements may include computer code stored on a non-transitory, computer-readable medium.

Additionally, the functional blocks and devices of the system 600 are but one example of functional blocks and devices that may be implemented in an embodiment of the invention. Those of ordinary skill in the art would readily be able to define specific functional blocks based on design considerations for a particular electronic device.

The system 600 may include servers 602, 604, in communication over a network 630. The server 604 may be similarly configured to the server 602.

As shown, the server 602 may include one or more processors 612, which may be connected through a bus 613 to a display 614, a keyboard 616, one or more input devices 618, and an output device, such as a printer 620. The input devices 618 may include devices such as a mouse or touch screen.

The server 602 may also be connected through the bus 613 to a network interface card 626. The network interface card 626 may connect the database server 602 to the network 630.

The network 630 may be a local area network, a wide area network, such as the Internet, or another network configuration. The network 630 may include routers, switches, modems, or any other kind of interface device used for interconnection.

The server 602 may have other units operatively coupled to the processor 612 through the bus 613. These units may include non-transitory, computer-readable storage media, such as storage 622.

The storage 622 may include media for the long-term storage of operating software and data, such as hard drives. The storage 622 may also include other types of non-transitory, computer-readable media, such as read-only memory and random access memory.

The storage 622 may include the software used in embodiments of the present techniques. In an embodiment of the invention, the storage 622 may include an original query 628, an augmented query 636, bit maps 634, auxiliary join tables 632, and a database management system (DBMS) 624. The database management system 624 may augment the original query 628 to generate an augmented query 636 that reduces the number of tuples flowing to the join without changing the join result.

In order to create the bit map 634 for a non-integer domain, an ordinal number (starting at 1) may be assigned to each value in the ordered domain. One or two auxiliary join tables 632 may be created for this purpose. The auxiliary join tables 632 may include two columns: the R.B/S.B value and the ordinal number. The auxiliary tables may be indexed on the R.B/S.B columns.

Before setting the bits in the bit map 634 for a particular value pair (R.B, S.B), the optimizer may look up the corresponding ordinal number in the auxiliary join tables 632 and use the ordinal number for indexing into the bit map 634.

In such an embodiment, the auxiliary join tables 632 may be maintained in accordance with modifications to the original join tables, e.g., R and S. The same technique may be used for non-dense integer domains.

Figure 7:
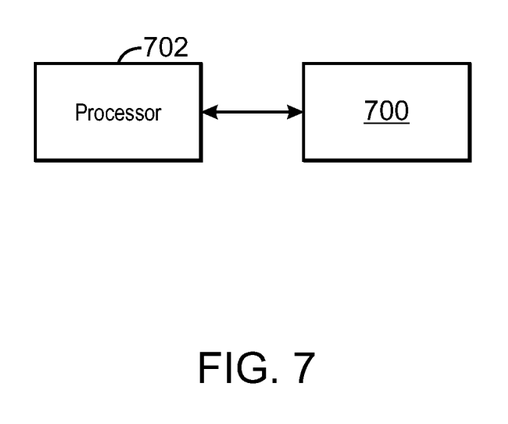
FIG. 7 is a block diagram showing a non-transitory, computer-readable medium that stores code for synchronizing a service-oriented architecture repository.

FIG. 7 is a block diagram showing a non-transitory, computer-readable medium that stores code for synchronizing a service-oriented architecture repository. The non-transitory, computer-readable medium is generally referred to by the reference number 700.

The non-transitory, computer-readable medium 700 may correspond to any typical storage device that stores computer-implemented instructions, such as programming code or the like. For example, the non-transitory, computer-readable medium 700 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

A processor 702 generally retrieves and executes the computer-implemented instructions stored in the non-transitory, computer-readable medium 700 to augment join queries to reduce the number of tuples processed by the join. A join query may be received. A bit map may be generated to determine a new predicate for the join query. The join query may be augmented with the new predicate, and the augmented join query executed.

What is claimed is:

1. A method of performing a database join, comprising:
   receiving a query specifying a join of a first table and a second table;
   determining a new predicate for the query based on a bit map, for a plurality of tuples of the join, between a first column of the first table, and a second column of the second table; and
   modifying the query such that the query comprises the new predicate;
   generating the bit map, wherein generating the bit map comprises:
      determining a plurality of potential value pairs between the first column and the second column;
      determining a plurality of actual value pairs in a plurality of tuples resulting from the join query; and
      setting a bit in the bit map to 1 for each of the plurality of actual value pairs.

2. The method recited in claim 1, comprising executing the modified query.

3. The method recited in claim 1, comprising:
   determining one or more additional predicates based on the mapping; and
   modifying the query such that the query comprises the one or more additional predicates.

4. The method recited in claim 1, wherein the mapping maps a first plurality of values of the first column to a second plurality of values of the second column.

5. The method recited in claim 1, comprising compressing the mapping.

6. The method recited in claim 1, wherein the new predicate specifies a range of values comprising the plurality of actual value pairs.

7. The method recited in claim 1, wherein determining the new predicate comprises:
   identifying a range of values in the second column that comprise a plurality of actual value pairs in a plurality of tuples resulting from the join query; and
   generating the new predicate such that the new predicate specifies that the second column is within the range of values.

8. A computer system for performing a database join, comprising:
   a memory; and
   a processor, configured to:
      receive a query specifying a join of a first table and a second table;
      generate a mapping that maps, for a plurality of tuples of the join, a first column of a first table to a second column of a second table;
      determine a new predicate for the query based on the mapping; and
      modify the query such that the query comprises the new predicate, wherein the mapping comprises a bit map, and wherein generating the mapping comprises:
         determining a plurality of potential value pairs between the first column and the second column;
         determining a plurality of actual value pairs in a plurality of tuples resulting from the join query; and
         setting a bit in the bit map to 1 for each of the plurality of actual value pairs.

9. The computer system recited in claim 8, wherein the processor is configured to execute the modified query.

10. A non-transitory, computer-readable medium comprising machine-readable instructions executable by a processor to perform a database join, wherein the machine-readable instructions, when executed by the processor, cause the processor to:
    generate a bit map that maps a first column of a first table to a second column of a second table;
    receive a query specifying a join of a first table and a second table;
    determine a new predicate for the query based on the bit map; and
    modify the query such that the query comprises the new predicate, wherein generating the bit map comprises:
       determining a plurality of potential value pairs between the first column and the second column;
       determining a plurality of actual value pairs in a plurality of tuples resulting from the join query; and
       setting a bit in the bit map to 1 for each of the plurality of actual value pairs.

11. The non-transitory, computer-readable medium recited in claim 10, wherein the machine-readable instructions, when executed by the processor, cause the processor to execute the modified query.

* * * * *